July 3, 1934.   F. L. BROWN   1,965,366
MOTION PICTURE APPARATUS
Filed Nov. 4, 1930
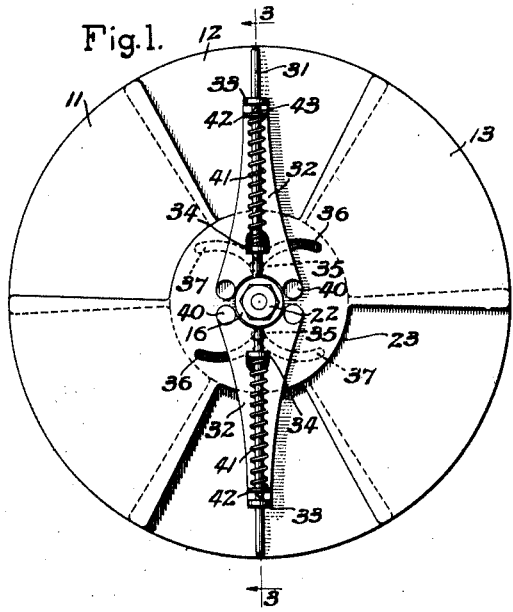
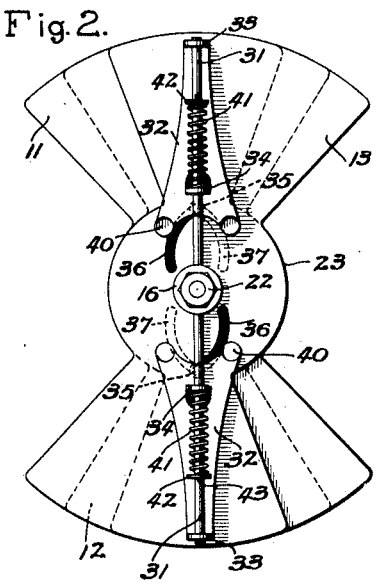
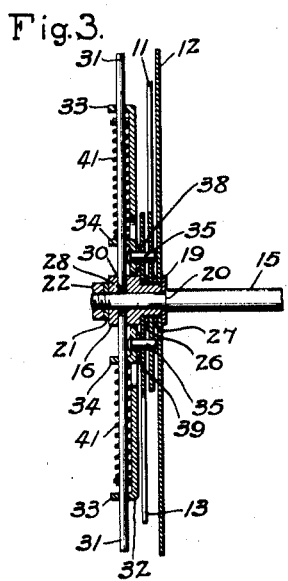
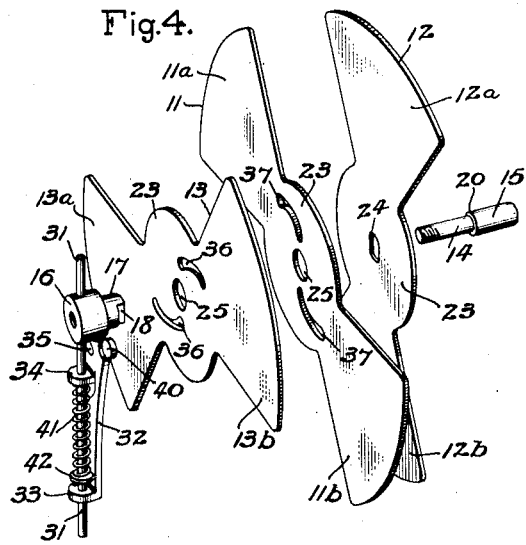
INVENTOR:
Freeman L. Brown,
BY
HIS ATTORNEY / Patented July 3, 1934

1,965,366

UNITED STATES PATENT OFFICE 1,965,366

MOTION PICTURE APPARATUS

Freeman L. Brown, Oaklyn, N. J., assignor, by mesne assignments, to Radio Corporation of America, New York, N. Y., a corporation of Delaware Application November 4, 1930, Serial No. 493,343

24 Claims. (Cl. 88—19.4)

My present invention relates to a safety shutter for motion picture apparatus and, more particularly, to a combined picture and fire shutter for use in moving picture projectors of the intermittent type.

Projectors of this type which, at present, are in general use employ a film which is highly inflammable, this type of film having been found to be most practical. As the film passes through the projector, it crosses the path of a beam of light emanating from a suitable light source, whereby an image is projected onto a suitable screen. Between the light source and the screen, there is located a rotating shutter adapted to intermittently interrupt the light beam in synchronism with the action of a film feeding mechanism which draws the film intermittently through the film gate of the projector.

By reason of the intense heat produced by a light source, such as is necessary to obtain a suitable image upon the screen, it becomes a menace to the highly inflammable film should the projector cease to function properly. Thus, for example, if the projector should operate below a certain critical speed or should the projector stop for some reason and the film so fail to be advanced through the gate that it becomes exposed to the heat of the light source for an appreciable length of time, the film may become ignited and in part, at least, be destroyed. To obviate this, various safety devices have been incorporated in the projector, but these, so far as I am aware, require a multiplicity of additional parts to render them properly operative and are usually elements separate from and even independent of the shutters themselves. There have also been proposed shutters to which safety devices have been added, but safety shutters of this type, generally, also have a number of additional parts and require such devices as clutches, friction elements, etc. for their successful operation. All this not only adds to the cost of manufacture but introduces sources of noise and vibration in the projector and, usually, necessitates operating the shutter in but a single position.

It is, therefore, a primary object of my invention to provide an improved shutter and safety device, combined in a single unit, that shall be entirely free of any extraneous parts.

Another object of my invention is to provide an improved safety shutter which will operate independently of the force of gravity and, hence, will be operative in any position.

A further object of my invention is to provide an improved safety shutter which will be controlled by and be responsive to the speed of the projector.

Still another object of my invention is to provide an improved safety shutter which will normally intercept all the light and heat rays from the light source and will permit the light to pass through the film only after a certain predetermined critical speed has been reached by the projector.

A further object of my invention is to provide an improved safety shutter which, under certain conditions of operation, will serve as a light shutter, while under other conditions, it will serve as a safety shutter.

It is a further object of my invention to provide an improved safety shutter which will permit the employment of highly inflammable film with practically no danger of ignition.

Still another object of my invention is to provide an improved safety shutter which will permit the light to reach the film only when the film is moving at such a speed that there is no danger of its becoming ignited.

A further object of my invention is to provide an improved safety shutter of the type set forth which will be rugged, durable in construction and efficient in use, as well as being compact and well suited to the requirements of economical manufacture.

The novel features that I consider characteristic of my invention are set forth with particularity in the appended claims, the invention itself, however, both as to its organization and its method of operation, together with additional objects and advantages thereof, being best understood from the following description of a specific embodiment, when taken in connection with the accompanying drawing in which Fig. 1 is a front elevation of my improved safety shutter showing the blades thereof in light-obstructing position, Fig. 2 is a similar view, but showing the blades in position to allow a projecting light beam to pass through the film, Fig. 3 is a sectional view taken along the line 3—3 of Fig. 1, and Fig. 4 is an exploded view in perspective, with several parts removed for the sake of clearness.

Refering to the drawing, in which similar reference numerals indicate corresponding parts throughout, my improved safety shutter comprises a plurality of blades 11, 12 and 13 mounted on the reduced, threaded end 14 of a shaft 15 which receives its power from some suitable, a constantly moving part of the projector. A sleeve 16, having a reduced portion 17 terminating in a still further reduced end 18, the latter being of substantially rectangular cross-section, is fitted over the reduced end 14 of the shaft. A washer 19 may be interposed between the end 18 and a shoulder 20 on the shaft 15 and another washer 21 may be disposed between the head of the sleeve 16 and a nut 22 which locks the sleeve to the shaft 15.

The blades 11, 12 and 13 are each formed of a substantially circular hub portion 23 terminating in sector-shape wings 11a, 11b; 12a, 12b; and 13a, 13b, respectively. The hub 23 of the blade 12 is provided, at its center, with a somewhat rectangular opening 24 which is adapted to fit snugly over the reduced end 18 of the sleeve 16 and, inasmuch as the sleeve 16 is locked to the shaft 15, as described above, the blade 12 also becomes fixed to the shaft and rotates with the shaft as a unit, remaining fixed or stationary relative to the sleeve 16. The blades 11 and 13 are provided, at the centers of their respective hubs, with circular openings 25 by which they are fitted loosely over the cylindrical portion 17 of the sleeve 16, being separated from each other and from the blade 12 by washers 26 and 27. The blades 11 and 13 are thus free to move about the sleeve, while the blade 12 can be moved along with the sleeve, it being obvious, therefore, that the blades 11 and 13 are movable relative to the blade 12.

The sleeve 16 is provided with openings 30 for receiving radially disposed guide rods 31 having their inner ends 28 knurled to afford sufficient frictional contact in the openings 30 to be held fast therein. Fly weights 32, which have lugs 33 and 34 struck up therefrom, are mounted on rods 31, the lugs having openings therein whereby the weights may be fitted to slide along the guide rods 31. The weights 32 are also provided with pins 35 which extend through arcuate slots 36 and 37 in the movable blades 13 and 11, respectively, the weights being spaced over the hub 23 of the blade 13 by washers 38 and 39. Depressed feet 40, on the enlarged portion of the weights 32, also assist in keeping the weights spaced from the blade 13 in addition to preventing rocking of the weights about the guide rods 31. It will be noted that the slots 36 and 37 are disposed concentrically about the centers of the hubs 23, those in blade 13 running in a direction opposite to those in blade 11, the two sets of slots overlapping each other, as clearly shown in Figures 1 and 2.

By virtue of the rods 31 being fixed to the sleeve 16 and the weights 32 being mounted on the rods 31, it follows that, as the shaft 15 rotates, the pins 35 will carry the blades 11 and 13 with them, so that the blades 11 and 13 will also rotate with the shaft and at the same angular speed. However, as the shutter mechanism gains speed, the fly weights 32 will move outwardly along the guides 31 under the influence of centrifugal force. To check this tendency, I provide coil springs 41 around the guides 31, the springs serving to normally prevent the weights 32 from sliding out along the guides. One end of each spring abuts against a shoulder or washer 42, which washers are fixed in their location on the guide rods 31 by stops, as cotter pins 43, extending through the rods, while the free end of each spring contacts with lug 34 on each fly weight. In order, therefore, for the fly weights to be able to move out along the guides 31, the centrifugal force developed must be great enough to overcome the tension of the springs 41, and not until then will the pins 35 act to move the blades 11 and 13 relative to the blade 12.

As soon, however, as the force exerted by the springs 41 is overcome, the weights 32 will fly outwardly, carrying the pins 35 with them and the pins, in turn, acting in the slots 36 and 37, will cause the blades 11 and 13 to rotate about the sleeve 16 with respect to the blade 12.

Under ordinary conditions, the blades 11, 12 and 13 are maintained in the slightly overlapping positions shown in Fig. 1. As shown in this figure, light passing from a suitable source on one side of the shutter blades is obstructed in its passage and cannot penetrate or pass through a film located on the other side thereof. When, however, the projector is set into operation, as soon as a certain predetermined operating speed of rotation has been reached by the shutter, at which speed the tension of springs 41 is adjusted to yield, the centrifugal force developed and acting upon the fly weights 32 causes these weights to automatically move outwardly as described heretofore, thereby forcing the movable blades 11 and 13 around the sleeve 16 to assume the positions relative to the blade 12 shown in Fig. 2. Each of the movable blades is caused to move toward the blade 12, the three blades, when in the positions shown in Fig. 2, then being in substantial alignment and providing an open path for the intermittent passage of the light through the shutter as the shutter continues to rotate.

So long as the shutter continues to rotate at or about the predetermined, critical, operating speed, there will be sufficient centrifugal force developed to maintain the blades in the position shown in Fig. 2, but should the speed drop below that critical speed, then the force of the springs will move the fly weights 32 and their pins 35 back to their original position, thereby returning the blades 11 and 13 to their original positions also, and thus automatically cutting off the light.

It will be noted that I have provided two sets of fly weights and two sets of slots 36 and 37, but it is obvious that the shutter may be operated with but one set of weights and slots. I prefer, however, to use two diametrically opposed sets of fly weights and slots, since the inertia of one weight will offset or neutralize the effect of the other when the shutter is rotating, and thereby rattling, vibration, noise and unnecessary wear will be eliminated. Similarly, although the slots 36 and 37 may be run in the same direction, or about the same geometric center, so that both blades 11 and 13 will, when actuated by pins 35, move in the same direction, I prefer to provide these slots in opposite directions so that the blades 11 and 13 will move toward each other, that is, one in a clockwise direction and the other in a counter-clockwise direction, thereby neutralizing any inertia effects of the movable blades themselves. In this way, I provide a combined light and fire shutter which eliminates in a simple manner the danger from fire hazard common to intermittent projectors, which is positive in its action, and which is free from vibration.

Although I have shown and described a certain specific embodiment of my invention, I am fully aware that many modifications thereof are possible. My invention, therefore, is not to be restricted except insofar as necessitated by the prior art and by the spirit of the appended claims.

I claim as my invention:

1. A safety shutter comprising a rotatable shaft, a sleeve on said shaft, a blade fixed to said sleeve for rotation therewith, a plurality of blades loose on said sleeve for movement thereon relative to said fixed blade, means for normally retaining said movable blades in light obstructing position and means for moving said relatively movable blades into substantial alignment with said fixed blade when the shaft has reached a predetermined rotary speed.

2. A safety shutter comprising a relatively stationary blade, a support therefor, a plurality of blades loosely mounted on said support for movement relative to said stationary blade, and normally cooperating with said stationary blade to obstruct the passage of light, and centrifugally operable means for moving said movable blades into substantial alignment with said stationary blade when the shutter has reached a predetermined rotary speed.

3. A safety shutter comprising a relatively stationary blade, a support therefor, at least one other blade loosely mounted on said support for movement relative to said stationary blade, said relatively movable blade having a slot therein, speed responsive means movable under the influence of centrifugal force, means associated with said support and with said speed responsive means for guiding movement of the latter along a predetermined path, said slot having its walls inclined angularly with respect to said path, and means on said speed responsive means extending into said slot for coaction with the walls thereof whereby movement of said speed responsive means causes movement of said relatively movable blade with respect to said relatively stationary blade.

4. A safety shutter comprising a relatively stationary blade, a plurality of blades movable relative to said stationary blade, said blades all combining, normally, to obstruct the passage of light, and centrifugally operable means in engagement with said movable blades for moving said blades into substantial alignment with said stationary blade to thereby permit the passage of light.

5. A safety shutter comprising a plurality of adjacently disposed blades normally obstructing the passage of light, one of said blades being stationary relative to the other blades, and speed responsive means for positively moving the remaining blades into substantial alignment with said stationary blade whereby to provide openings for the passage of light.

6. In a safety shutter, a relatively stationary blade, a plurality of relatively movable blades, said blades all combining, normally, to obstruct the passage of light, centrifugal means in engagement with said movable blades for moving said blades into substantial alignment with said stationary blade when the shutter has reached a predetermined speed of rotation, and means for returning said centrifugal means to normal position when the speed of said shutter falls below said predetermined speed.

7. In a safety shutter, a relatively stationary blade, a plurality of relatively movable blades, said blades all combining, normally, to obstruct the passage of light, centrifugal means in engagement with said movable blades for moving said blades into substantial alignment with said stationary blade when the shutter has reached a predetermined speed of rotation, and means for returning said movable blades to normal position when the speed of said shutter falls below said predetermined speed.

8. In a safety shutter, a relative stationary blade, a plurality of relatively movable blades, said blades all combining, normally, to obstruct the passage of light, centrifugal means in engagement with said movable blades for moving said blades into substantial alignment with said stationary blade when the shutter has reached a predetermined speed of rotation, and means for returning both said centrifugal means and said movable blades to normal position when the speed of said shutter falls below said predetermined speed.

9. In a safety shutter, a relatively stationary blade, a plurality of blades movable relative to said stationary blade, said movable blades having slots therein, centrifugal means in engagement with said movable blades in the slots thereof for moving said movable blades into substantial alignment with said stationary blade when the shutter has reached a predetermined speed, and means adapted to maintain said centrifugal means ineffective when the shutter falls below said predetermined speed.

10. In a safety shutter, a support, a relatively stationary blade fixed thereto, a plurality of slotted, relatively movable blades loosely mounted on said support adjacent said stationary blade to obstruct the passage of light, guides fixed to said support, centrifugal means slidable on said guides and in engagement with the slots of said movable blades, whereby said movable blades are maintained in light-obstructing position, and means urging said centrifugal means to maintain said movable blades in said light-obstructing position.

11. In a safety shutter, a support, a relatively stationary blade fixed thereto, a plurality of slotted, relatively movable blades loosely mounted on said support adjacent said stationary blade, said stationary and movable blades combining to normally obstruct the passage of light, guides fixed to said support, and centrifugal means slidable on said guides and in engagement with the slots of said movable blades whereby said movable blades are maintaintd in light-obstructing position when said shutter is rotating below a predetermined speed, but are moved into substantial alignment with said stationary blade to permit passage of the light when the shutter has exceeded said predetermined speed.

12. In a safety shutter, a support, a relatively stationary blade fixed thereto, a plurality of slotted, relatively movable blades loosely mounted on said support adjacent said stationary blade, said stationary and movable blades combining to normally obstruct the passage of light, guides fixed to said support, centrifugal means slidable on said guides and in engagement with the slots of said movable blades whereby said movable blades are maintained in light-obstructing position when said shutter is rotating below a predetermined speed, but are moved into substantial alignment with said stationary blade to permit passage of the light when the shutter has exceeded such predetermined speed, and means for returning said centrifugal means and movable blades to normal, light-obstructing position when the speed of the shutter falls below said predetermined speed.

13. A safety shutter comprising a rotatable shaft, a sleeve on said shaft, a blade fixed to said shaft for movement therewith, a plurality of blades loose on said sleeve for movement thereon relative to said fixed blade and combining with said fixed blade to normally obstruct the passage of light, said latter blades having slots therein, guide rods fixed to said sleeve, speed responsive weights slidable on said guide rods, depressions on said weights for maintaining them in spaced relation to said movable blades, and pins on said weights extending through the blade slots whereby movement of said weights in response to a predetermined speed causes movement of said movable blades into substantial alignment with said fixed blade to thereby permit the passage of light.

14. In a safety shutter, a pair of concentrically disposed movable blades having arcuate slots therein, the projections of said slots upon a common plane intersecting each other, and means movable in said slots for imparting movement to said blades.

15. In a safety shutter, a pair of concentrically disposed movable blades having arcuate slots therein, said slots having different geometric centers and the projections thereof upon a common plane intersecting each other, and means movable in said slots for imparting movement to said blades.

16. In a safety shutter, a pair of concentrically disposed movable blades having arcuate slots therein, said slots having different geometric centers, the slots in one blade running in a direction opposite to the slots of the other blade and the projections of said slots upon a common plane intersecting each other, and means movable in said slots for imparting movement to said blades.

17. In combination, a support, a pair of blades disposed concentrically on said support and having arcuate slots therein, the projections of said slots upon a common plane intersecting each other, guide rods on said support, and means slidable on said guide rods and in engagement with said slots for imparting movement to said blades.

18. In combination, a support, a pair of blades disposed concentrically on said support and having arcuate slots therein, guide rods on said support and speed responsive means slidable on said guide rods and in engagement with said slots for imparting movement to said blades.

19. In a safety shutter, a plurality of movable blades, means slidable over one of said blades and engaging each of said blades for imparting movement to all of said blades, and means for maintaining said movement imparting means spaced from another of said blades.

20. In a safety shutter, a plurality of movable blades, means slidable over one of said blades and engaging each of said blades for imparting movement to all of said blades, and means on said first named means for preventing rocking thereof relative to said blades.

21. In a safety shutter, a relatively stationary blade, a plurality of blades movable relative to said stationary blade and having complementary slots therein, and means movable in said slots for moving said blades toward a position in alignment with said stationary blade, said slots limiting the movement of said means.

22. In a safety shutter, a relatively stationary blade, a plurality of blades movable relative to said stationary blade and having complementary slots therein, and means movable in said slots for moving said blades toward a position in alignment with said stationary blade, said means and slots also cooperating to limit the movement of said movable blades toward said position.

23. In a safety shutter, a relatively stationary blade, a plurality of blades movable relative to said stationary blade and having complementary slots therein, and speed responsive means movable in said slots for moving said blades toward a position in alignment with said stationary blades, said means and slots also cooperating to limit the movement of said movable blades toward said position.

24. In a safety shutter, a support, a relatively stationary blade fixed thereto, a plurality of slotted, relatively movable blades loosely mounted on said support adjacent said stationary blade and cooperable therewith to normally obstruct the passage of light, guides fixed to said support, centrifugal means slidable on said guides and in engagement with the slots of said movable blades, whereby said movable blades are maintained in light-obstructing position, means urging said centrifugal means to maintain said movable blades in said light-obstructing position, and means on said centrifugal means for preventing rocking thereof about said guides.

FREEMAN L. BROWN.